United States Patent [19]

Ellege

[11] 4,043,431
[45] Aug. 23, 1977

[54] VIBRATION DAMPER AND METHOD OF MAKING THE SAME

[75] Inventor: Weldon B. Ellege, Conway, Ark.

[73] Assignee: FMC Corporation, San Jose, Calif.

[21] Appl. No.: 659,821

[22] Filed: Feb. 20, 1976

Related U.S. Application Data

[63] Continuation of Ser. No. 527,980, Nov. 29, 1974, which is a continuation of Ser. No. 446,565, Feb. 27, 1974, abandoned.

[51] Int. Cl.$^2$ ............................................. F16F 15/12
[52] U.S. Cl. ..................................... 188/1 B; 74/574; 188/218 A; 188/218 XL; 188/268
[58] Field of Search ............. 74/574; 188/1 B, 218 A, 188/268, 218 XL

[56] References Cited

U.S. PATENT DOCUMENTS

| | | | |
|---|---|---|---|
| 2,977,819 | 4/1961 | Haushalter | 74/574 |
| 3,041,889 | 7/1962 | Haushalter | 74/574 |
| 3,058,208 | 10/1962 | Haushalter | 188/188.1 B UX |
| 3,611,830 | 10/1971 | Shank | 74/574 |
| 3,774,473 | 11/1973 | Mitchell | 74/574 |
| 3,901,046 | 8/1975 | Hofmann | 74/574 X |

*Primary Examiner*—Samuel Scott
*Assistant Examiner*—Don E. Ferrell
*Attorney, Agent, or Firm*—A. J. Moore; R. B. Catto; C. E. Tripp

[57] ABSTRACT

A vibration damper for inhibiting harmonic vibrations in a brake rotor during resurfacing operations is made by forming an elastic tube or band into a closed loop with tubular iron weights strung thereon before the loop is joined. The elastic tube is first stretched lengthwise to make its lateral dimensions small enough to thread through the tubular weights, and the tube is then relaxed and its ends are interconnected. The elasticity of the thus formed damper holds the tubular iron weights in preselected position on the tube and also allows it to be stretched over the edge of brake rotors which vary considerably in size. The resilient tube of the damper resiliently engages the outer periphery of the rotor to retain the weights in place on the periphery of the rotor as the weights damp the vibrations which occur while the spinning rotor is having its radial braking surfaces machined.

17 Claims, 5 Drawing Figures

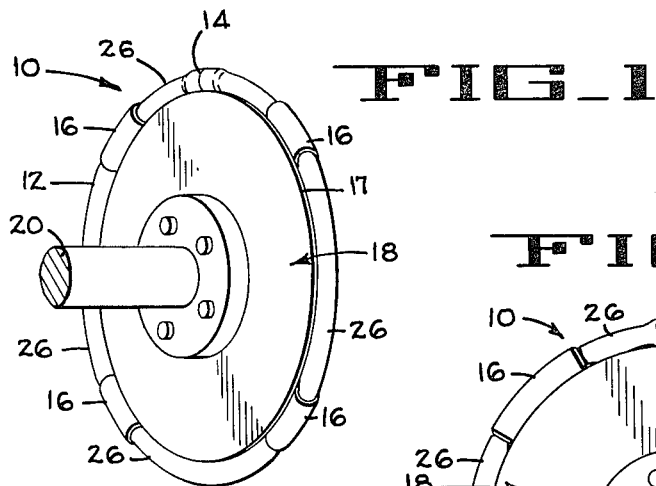
FIG_1
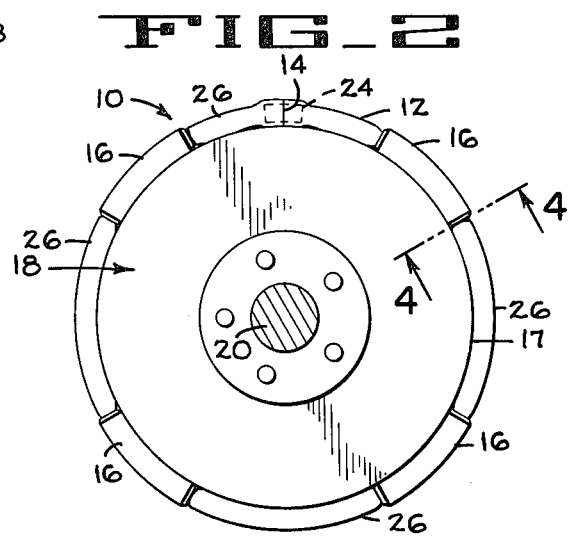
FIG_2
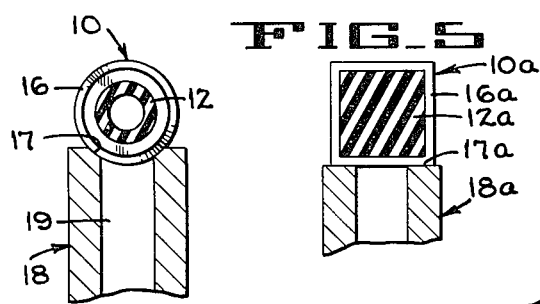
FIG_5
FIG_4
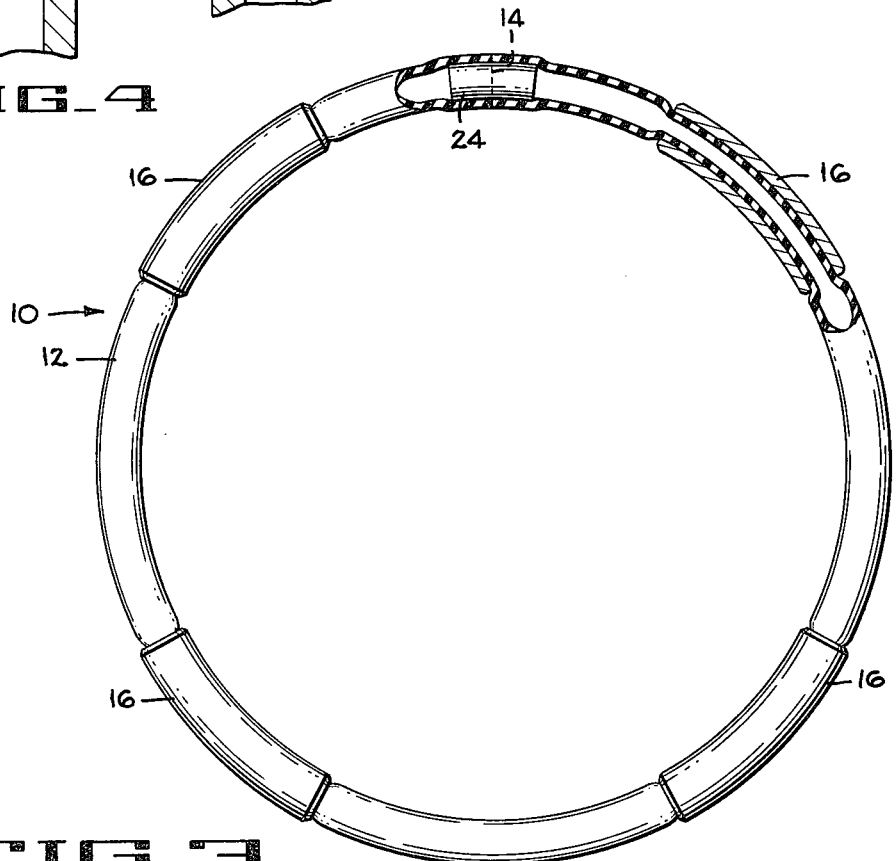
FIG_3

VIBRATION DAMPER AND METHOD OF MAKING THE SAME

This is a continuation of application Ser. No. 527,980, filed Nov. 29, 1974, which was a continuation of application Ser. No. 446,565, filed Feb. 27, 1974, now abandoned.

BACKGROUND OF THE INVENTION

1. Field of the Invention

The field of the present invention concerns machines for resurfacing disc brake rotors, and brake drums, and more specifically relates to a detachable damper for minimizing harmonic vibrations of the rotor or drum when it is subjected to a machining operation to renew its braking surfaces.

2. Description of Prior Art

In some resurfacing machines for disc brake rotors, both sides of the disc are simultaneously ground to insure absolute parallelism of the braking surfaces. In other machines, each side of the rotor is separately resurfaced. During either type of resurfacing operation, it is conventional practice to have mounted on the rotor disc an auxiliary damping device which will surpress or prevent harmonic vibrations in the discs, which vibrations would otherwise cause some degree of chatter and impair the smoothness of the surface created by the machining operation.

A disc brake resurfacing machine is disclosed in my U.S. Pat. No. 3,500,589 which issued on Mar. 17, 1970, and is incorporated by reference herein. The vibration damper of the present invention may be mounted on disc brake rotors resurfaced by the machine disclosed in my patent.

In regard to vibration dampers, the U.S. Pat. No. 3,611,830, to Shank which issued on Oct. 12, 1971, includes a spring tensioned loop which engages the peripheral edge of a brake rotor disc and carries lead weights that will alter and damp the resonance response to the disc. The patentee specifically states that iron weights were tried but did not successfully reduce vibration, and accordingly, he has relied upon more expensive lead weights. The Shank device also specifically recognizes and meets the problem of accommodating the simultaneous machining of both radial surfaces of the disc.

Another U.S. Pat. No. 3,345,884, to Kuderko issued on Oct. 10, 1967 also concerns the problem of damping vibrations in a disc brake rotor undergoing an operation to refinish its braking surfaces. In this patented device, a generally U-shaped frame carries permanent magnets which function both as weights and as attachment means for the frame. The frame is fixed to one radial surface while the other radial surface is being refinished, and of course, the device is limited to brake disc rotors of ferrous material.

Other patents of general interest concerning brake dampers are Fosberry, U.S. Pat. No. 2,941,631 and Huck, U.S. Pat. No. 1,846,257, both of which disclose brake drum dampers used to prevent or suppress vibrations under operating conditions by engagement with the axial wall portion of the brake drum. Only the Shank Patent supra, is considered to be applicable to both disc type and drum type brakes in a resurfacing operation.

SUMMARY OF THE INVENTION

The present invention generally comprises an elastic band with a plurality of apertured weights strung thereon, the diameter of the band in relaxed condition being larger than the apertures in said weights so that the weights remain in position on the band when the band is attached to a brake rotor to dampen the vibrations created during the refacing thereof.

In the preferred embodiment of the invention, the vibration damper is constructed by merely stretching a surgical tube to reduce its diameter so that a plurality to tubular iron, steel or other hard inexpensive arcuate weights can be slid over the tube to evenly spaced positions. The resilient surgical tube is then relaxed thus locking the tubular weights in place, and thereafter the free ends are interconnected. Thus, the damper is very easily made and is very inexpensive since all materials used are inexpensive and readily avialable, and no expensive assembly problems are involved.

BRIEF DESCRIPTION OF DRAWINGS

FIG. 1 is a perspective showing a brake rotor mounted on the output shaft or arbor of a rotor finishing machine, with the vibration damper of the present invention installed on the periphery or arcuate rim of the rotor.

FIG. 2 is a slightly enlarged end elevation of the vibration damper shown in FIG. 1.

FIG. 3 is an enlarged elevation, partly broken away, of the vibration damper.

FIG. 4 is a transverse radial section taken along lines 4—4 of FIG. 2 through a fragment of the periphery of a disc brake rotor with the preferred embodiment of the vibration damper mounted thereon.

FIG. 5 is a transverse radial section through a fragment of the periphery of a modified form of disc brake rotory and a modified embodiment of the vibration damper.

DESCRIPTION OF PREFERRED EMBODIMENT

The vibration damper 10 (FIG. 1) of the present invention includes a length of elastic tube or band 12 which has it's free ends joined or held in abutting relation at 14. Spaced about the thus formed loop are a plurality of iron or steel weights 16. In use, the loop 12 is stretched over the outer edge or periphery 17 of a brake rotor 18 (FIGS. 2 and 4) that is provided with ventilation slots 19 and is mounted on the output shaft or arbor 20 of a brake resurfacing machine (not shown) to renew the braking surfaces by a machining operation.

Disc brake rotors for passenger cars and trucks upon which the preferred vibration damper 10 may be used are ventilated rotors having a diameter within the range of approximately 10 inches to 16 inches, and have a thickness within the range of approximately 11/16 inches to 2¼ inches. It will be understood that more than one vibration damper 10 may be used on very thick rotors if desired.

In renewing the brake rotor 18, a cutting tool of the brake drum lathe engages the flat radial braking surface (FIG. 4), and another tool engages the opposite radial surface, to smoothly refinish the rotor. Meanwhile, the vibration damper 10 operates as previously described to suppress the outer portion of the rotor from vibrating, flexing, or chattering axially relative to its hub portion, so that the tools can machine the braking surface of the rotor smooth and planar and at the same time minimize noise.

In accordance with the present invention, no expensive components are required such as cast lead weights, weight attachment means, or clamping devices to mount the vibration damper 10 on the periphery of the rotor. The damper will operate with the wide range of rotor diameters indicated above because a length of gum rubber or surgical tubing 12 that is shorter than the circumference of the smallest diameter rotor is formed into a resilient loop. The free ends of the tubing 12 are connected preferably by stretching the ends over and adhering them to a wooden dowel 24. A dowel of 7/16 of an inch diameter and 1 inch long, and gum tubing of ⅜ of an inch inside diameter and about 30 inches long, has been found to be easily stretched over the rim of any standard size brake rotor having diamensions which lie within the above mentioned ranged without disturbing the dowel connection.

The arcuate iron weights 16 are installed, before the dowel connection of the tubing is made, by longitudinally stretching the tubing of the loop 12. This stretching reduces the cross sectional area of the tubing permitting the tubular weights to be slid to desired position on the tube. When the arcuate weights are positioned with their axes of generation perpendicular to a common plane, the dowel connection is made, and the vibration damper 10 is ready for use. From the preceding description of the assembly procedure, it is evident that another feature of the present invention is that the vibration damper can be assembled without any special jigs, fixtures, or tools.

In accordance with another feature of the invention, the arcuate iron weights 16 are gripped and held in place only by the transverse resilient expansion of the tubing loop 12. By this means, the weights 16 may easily be circumferentially adjusted at any time. In accordance with a further feature, the weights 16 are formed of readily obtainable, inexpensive, steel or iron tubing that is bent into arcuate segments having a radius either conforming to the diameter of a specific rotor size, or to the average of a range of sizes. An iron tubing size which works well with the gum rubber tubing of ⅜ of an inch inside diameter and 9/16 of an inch outside diameter, is ⅝ of an inch outside diameter, and 0.394 of an inch inside diameter. Gum rubber tubing of a desirable elasticity resiliency, and longevity is widely available as surgical tubing from medical supply sources, and others.

It will be apparent that when the vibration damper 10 is stretched into operative position as shown in FIG. 2, that the tensioned segments at 26 between two adjacent tubular iron weights 16 partially collapse and grip the periphery of the brake rotor with sufficient force to cause the hard metal weights to engage the rotor 18 firmly enough to reliably perform the dampening function. Since the surface of the tube which contacts the rim of the rotor tends to collapse and assume the arcuate shape of the rotor rim as mentioned above, the vibration damper 10 will stay in place even on relatively thin rotor discs.

In FIG. 5 a modified vibration damper 10a is disclosed for use on a ventilated disc brake rotor 18a having a circular periphery 17a that is flat transversely. The vibration damper 10a includes elongated tubular arcuate iron weights 16a similar to the weights 16 but rectangular or square in cross section. The weights 16a are threaded on a rectangular elastic band 12a after stretching the band in a manner quite similar to the first embodiment of the invention. Thereafter, the ends of the band 12a are connected together as by bonding.

In the claims it will be understood that the term "iron weights" includes steel and other hard inexpensive metals.

Although the best mode contemplated for carrying out the present invention has been herein shown and described, it will be apparent that modification and variation may be made without departing from what is regarded to be the subject matter of the invention.

I claim:

1. A vibration damper for inhibiting resonant vibrations in a brake rotor during refacing, said damper comprising: an elastic band having a relaxed length less than the circumference of the rotor; means for interconnecting the free ends of said band to form a loop; and a plurality of apertured weights strung on said elastic band, the outside diameter of said band in relaxed condition being larger than the apertures in said weights.

2. A vibration damper according to claim 1 wherein said weights are iron weights.

3. A vibration damper according to claim 1 wherein said weights are axially elongated and are arcuate in longitudinal cross section.

4. A vibration damper according to claim 1 wherein said weights are tubular and have a circular transverse cross section.

5. A vibration damper according to claim 1 wherein said elastic band is formed of surgical tubing, said interconnecting means comprising a plug expanding said free ends to a diameter approximately equal to the maximum lateral dimension of said weights.

6. A vibrating damper according to claim 1 wherein said weights are tubular and have a substantially rectangular transverse cross section.

7. A vibration damper according to claim 6 wherein said elastic band is rectangular in transverse cross section and wherein said band when in relaxed condition is larger than the inner dimensions of said rectangular tubular weight.

8. A vibration damper for inhibiting resonant vibrations in a brake rotor during refacing, said damper comprising: an elastic tube having a relaxed length less than the circumference of the rotor; means for interconnecting the free ends of said tube to form an endless loop; and a plurality of hollow and elongated curvilinear iron weights strung on said elastic tube, said elastic tube in relaxed condition maintaining firm gripping engagement with said weights.

9. A vibration damper according to claim 8 wherein said weights are round tubes, the outside diameter of said elastic tube in relaxed condition being larger than the inside diameter of said weights.

10. A vibration damper according to claim 8 wherein said elastic tube when applied on a disc brake rotor stretches and collapses against the periphery of the brake rotor to urge said weight against the rotor with sufficient force to damp vibrations.

11. A vibration damper according to claim 9 wherein said elastic tube is formed of surgical tubing, said interconnecting means comprising a plug expanding said free ends to a diameter less than the outside diameter of said weights.

12. A method of manufacturing a detachable vibration damper for damping the harmonic vibrations in a brake rotor temporarily mounted on a refacing machine, said method comprising the steps of: stretching an elongate tube of resilient, flexible and stretchable material lengthwise to reduce the transverse dimension of said tube; stringing tubular weights, having an inside diameter less than the outside diameter of said tube in unstretched condition, on the tube; and interconnecting the free ends of said tube to form an endless, expansible loop.

13. A method of manufacturing a detachable vibration damper for damping the harmonic vibrations in a brake rotor temporarily mounted in a resurfacing machine with hard metal tubular weights, said method comprising the steps of: selecting an elongated narrow band of resilient, flexible and stretchable material which narrows in width when it is stretched lengthwise; selecting tubular weights having an inside cross sectional area less than the overall cross sectional area of said band in unstretched condition; gripping and stretching the band lengthwise sufficient to string the weights thereon; installing said weights; releasing the gripping of said band to allow it to resume its relaxed condition and expand transversely into gripping engagement with said weights; and interconnecting the free ends of said band to form an endless, expansible loop.

14. A method according to claim 13 wherein the tubular weights are axially elongated, and additionally including the step of bending the elongated tubular weights into longitudinal arcuate cross section.

15. A vibration damper for inhibiting resonant vibrations in a brake rotor during refacing, said damper comprising: an elastic band; means for interconnecting the end portions of said band to form a loop of a diameter such that the band is stretched when it is placed on the circumference of said brake rotor; and a plurality of apertured weights strung on said elastic band, the outside diameter of said band in relaxed condition being larger than the apertures in said weights.

16. A vibration damper according to claim 15 wherein said weights are axially elongated and are arcuate in longitudinal cross section.

17. A vibration damper according to claim 15 wherein said weights are iron weights.

* * * * *